United States Patent [19]

Link

[11] 4,293,291
[45] Oct. 6, 1981

[54] GEAR PUMP WITH IMPROVED SHAFT SEAL

[75] Inventor: John R. Link, Portage, Mich.

[73] Assignee: General Signal Corporation, Stamford, Conn.

[21] Appl. No.: 62,837

[22] Filed: Aug. 1, 1979

Related U.S. Application Data

[63] Continuation of Ser. No. 861,745, Dec. 19, 1977, abandoned.

[51] Int. Cl.³ .......................... F04C 2/18; F04C 15/00; F16J 15/46; F16C 33/74
[52] U.S. Cl. .................................. 418/104; 418/149; 418/206; 277/27; 308/36.3
[58] Field of Search .............. 418/104, 149, 205, 206, 418/131–135; 277/27, 96, 96.1, 96.2, 188 A, DIG. 6; 308/36.1, 36.3

[56] References Cited

U.S. PATENT DOCUMENTS

| | | | |
|---|---|---|---|
| 2,246,805 | 6/1941 | Marshall | 308/36.3 |
| 2,391,577 | 12/1945 | Larson | 418/206 |
| 2,660,958 | 12/1953 | Lauck | 418/131 |
| 2,772,928 | 12/1956 | Schulz et al. | 308/36.1 |
| 2,798,005 | 7/1957 | Love | 277/DIG. 6 |
| 2,857,213 | 10/1958 | Meier | 308/36.1 |
| 3,104,616 | 9/1963 | Peet | 418/206 |
| 3,350,985 | 11/1967 | Ackley | 418/206 |
| 3,472,170 | 10/1969 | Eckerle | 418/206 |
| 3,494,677 | 2/1970 | Arnis | 308/36.1 |
| 3,663,076 | 5/1972 | Valente | 308/36.1 |
| 3,776,611 | 12/1973 | Jentsch | 308/36.1 |
| 3,827,837 | 8/1974 | Pattas et al. | 418/104 |
| 3,945,779 | 3/1976 | Vlemmings et al. | 418/206 |

FOREIGN PATENT DOCUMENTS

| | | | |
|---|---|---|---|
| 1181786 | 1/1959 | France | 418/134 |
| 1603013 | 4/1971 | France | 277/DIG. 6 |
| 906080 | 9/1962 | United Kingdom | 277/96 |
| 913908 | 12/1962 | United Kingdom | 308/36.3 |

Primary Examiner—John J. Vrablik
Attorney, Agent, or Firm—Thomas R. FitzGerald; Jeffrey S. Mednick

[57] ABSTRACT

A gear pump for pumping hydraulic fluid includes housing, a pair of gears mounted for rotation within the housing, and a drive shaft affixed to one of the gears for transmitting a rotational input force to that gear. The drive shaft includes a portion extending outwardly beyond the housing. A bushing is provided surrounding the drive shaft and secured to the housing so that the drive shaft is free to rotate within the bushing. The bushing is positioned along the drive shaft between the driven gear and the portion of the drive shaft that extends beyond the housing. The bushing includes an end surface facing the driven gear and an annular recess in the end surface adjacent the drive shaft. A dynamic sealing member is positioned within the annular recess for minimizing the amount of leakage of the pumped fluid along the drive shaft.

5 Claims, 2 Drawing Figures

GEAR PUMP WITH IMPROVED SHAFT SEAL

This is a continuation, of application Ser. No. 861,745, filed Dec. 19, 1977, now abandoned.

BACKGROUND OF THE INVENTION

The present invention relates generally to hydraulic gear pumps and more particularly to an improved shaft seal for a hydraulic gear pump.

In the manufacture of gear pumps, it is known that a high pressure seal is required to limit leakage of hydraulic fluid along the pump drive shaft. The amount of leakage along the drive shaft is primarily a function of pump output pressure. Thus, in small displacement pumps, the leakage along the drive shaft can seriously degrade the volumetric efficiency of the pump. Thus, a need has developed for a simple, reliable, and effective dynamic seal along the drive shaft of a gear pump to minimize the amount of leakage of hydraulic fluid along the shaft.

SUMMARY OF THE INVENTION

Accordingly, the present invention provides a gear pump for pumping hydraulic fluid which includes a housing, a pair of gears mounted for rotation within the housing, and a drive shaft affixed to one of the gears for transmitting a rotational input force to that gear. The drive shaft includes a portion extending outwardly beyond the housing. A bushing is provided surrounding the drive shaft and secured to the housing so that the drive shaft is free to rotate within the bushing. The bushing is positioned along the drive shaft between the driven gear and the portion of the drive shaft that extends beyond the housing. The bushing includes an end surface facing the driven gear and an annular recess in the end surface adjacent the drive shaft. A dynamic sealing member is positioned within the annular recess for minimizing the amount of leakage of the pumped fluid along the drive shaft.

OBJECTS OF THE INVENTION

An object of the present invention is the provision of an improved dynamic sealing arrangement for minimizing the amount of leakage of pumped fluid along the drive shaft of a gear pump.

Another object of the present invention is the provision of an improved dynamic sealing member for minimizing the amount of leakage of pumped fluid along the drive shaft of a gear pump.

A further object of the present invention is the provision of a dynamic sealing member for the drive shaft of a gear pump which is simple, inexpensive to manufacture, and reliable.

Other objects, advantages, and novel features of the present invention will become apparent from the following detailed description of the invention when considered in conjunction with the accompanying drawings.

DESCRIPTION OF THE PREFERRED EMBODIMENT

Figure 1:
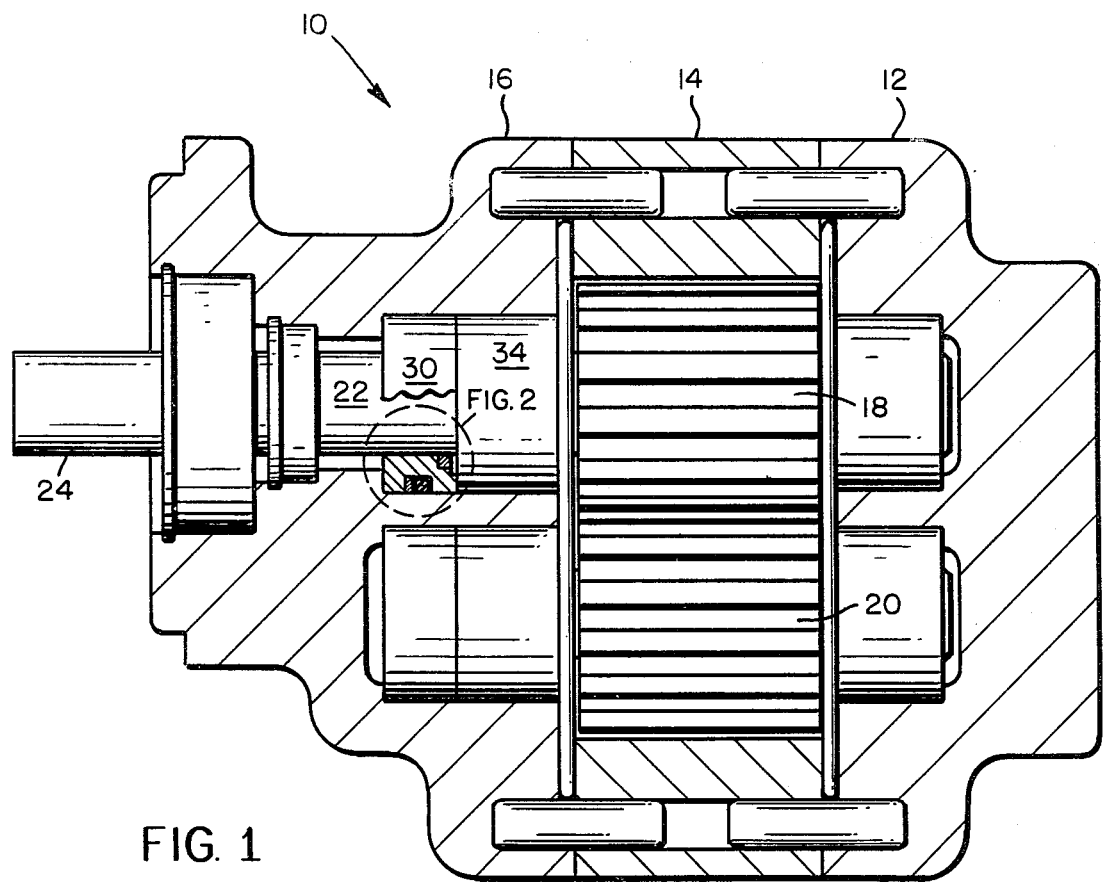
FIG. 1 is a side view in partial cross section of the gear pump including the features of the present invention.
Figure 2:
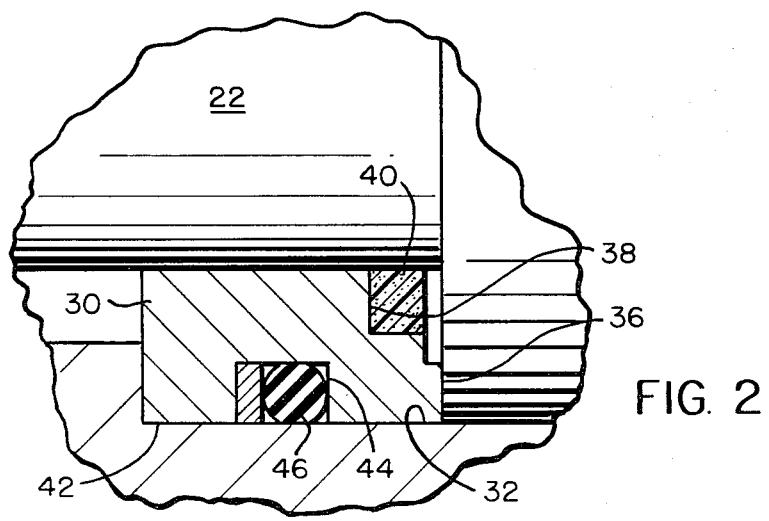
FIG. 2 is an enlarged view of the bushing and sealing ring shown in FIG. 1.

The preferred embodiment of the present invention will be described in detail in connection with FIGS. 1 and 2. A gear pump 10 is illustrated for pumping hydraulic fluid. The pump 10 includes a pump housing, which in this embodiment is a three-piece housing, comprising sections 12, 14 and 16. A pair of gears 18 and 20 are mounted for rotation within the housing and serve as impellers for pumping hydraulic fluid. Gear 18 is a driven gear and is affixed to a drive shaft 22. The drive shaft 22 includes a portion 24 extending outwardly beyond the gear pump housing, so that the drive shaft may be coupled to a prime mover (not shown). Thus, the drive shaft 22 serves to transmit a rotational input force to driven gear 18.

A bushing 30 is secured to housing section 16 in such a manner that the drive shaft 22 is free to rotate within a bore 32 of bushing 30, in a known manner. The bushing 30 is positioned along the drive shaft 22 between the driven gear 18 and the portion 24 of drive shaft 22 that extends beyond the gear pump housing. Preferably, the bushing 30 is located adjacent a roller bearing assembly 34 and abuts a shoulder in housing section 16. The bushing 30 includes an end surface 36 that faces the driven gear 18. The bushing 30 is preferably in the shape of a right circular cylinder, and thus, the end surface 36 is preferably perpendicular to the drive shaft 22.

The bushing 30 includes an annular recess 38 in the end surface 36 adjacent the drive shaft 22. A dynamic sealing member 40 surrounds shaft 22 and is positioned within the annular recess 38 for minimizing the amount of leakage of pump fluid along the drive shaft 22. The dynamic sealing member 40 may be made of any sturdy resilient material capable of creating a good dynamic seal. For example, the sealing ring 40 may be made of bronze-filled polytetrafluorethylene. In the preferred embodiment the sealing ring 38 is made of 60% bronze-filled polytetrafluoroethylene. Because the dynamic sealing member 40 is located in the recess 38 of the end surface 36, the member 40 is exposed to fluid pressure components parallel to the drive shaft 22 which force the member 40 into the annular recess 38 thereby aiding in the creation of a dynamic seal between the member 40 and the drive shaft 22.

The bushing 30 further includes a cylindrical outer surface 42 adjacent housing section 16. The cylindrical outer surface 42 has an annular slot 44 therein. A static sealing member 46 is positioned within the annular slot 44 adjacent the housing section 16 to further reduce leakage of pump fluid from the housing.

Thus, it is apparent that an improved dynamic sealing arrangement has been provided for minimizing the amount of leakage of pump fluid along the drive shaft of a gear pump. The sealing member 40 is simple in construction, inexpensive to manufacture, and forms a reliable seal. In addition, the location of the member 40 within the recess 38 of the end surface 36 enables the sealing member 40 to be easily installed in the bushing 30.

While there has been described what is at present considered to be the preferred embodiment of the present invention, it will be obvious to those skilled in the art that various changes and modifications may be made therein, without departing from the invention, and it is, therefore, aimed in the appendant claims to cover all such changes and modifications as followed in the true spirit and scope of the invention.

What is claimed is:

1. A gear pump for pumping hydraulic fluid under high pressure, comprising a housing, a pair of gears mounted for rotation within said housing, a drive shaft affixed to one of said gears for transmitting a rotational input force to said one gear, said drive shaft including a portion extending outwardly beyond said housing, and a bushing surrounding said drive shaft and secured to said housing so that said drive shaft is free to rotate within said bushing, said bushing being positioned along said drive shaft between said one gear and the portion of said drive shaft that extends beyond said housing, said bushing including an end surface facing said one gear, an annular recess in said end surface adjacent to said drive shaft for supporting and retaining a dynamic sealing member, and a unitary dynamic sealing member formed of resilient material positioned within said annular recess, and exposed to said high pressure hydraulic fluid which forces said dynamic sealing member into said annular recess thereby aiding in the creation of a dynamic seal between the drive shaft and the dynamic sealing member for minimizing the amount of leakage of said pumped high pressure fluid along said drive shaft.

2. A gear pump as defined in claim 1 wherein said dynamic sealing member is an annular unitary sealing ring made of bronze-filled polytetrafluoroethylene.

3. A gear pump as defined in claim 1 wherein said end surface of said bushing is substantially perpendicular to said drive shaft and wherein said dynamic sealing member is exposed to a high fluid pressure component parallel to said drive shaft which forces said sealing member into said annular recess thereby aiding in the creation of a dynamic seal between said sealng member and said drive shaft.

4. A gear pump as defined in claim 1 wherein said bushing includes a cylindrical outer surface adjacent said housing, said cylindrical outer surface having an annular slot for supporting and retaining a static sealing member therein, and further comprising a static sealing member positioned within said annular slot adjacent said housing to further reduce leakage of said pumped fluid from said housing.

5. A gear pump as defined in claim 1 including a roller bearing assembly for rotatably supporting said drive shaft, said roller bearing assembly disposed between said bushing and said one gear facing said bushing whereby said bushing and dynamic sealing member substantially seal off high pressure hydraulic fluid from leaking along said drive shaft while said roller assembly substantially rotatably supports said drive shaft.

* * * * *